(12) United States Patent
Brooks et al.

(10) Patent No.: US 8,761,027 B2
(45) Date of Patent: Jun. 24, 2014

(54) METHOD AND SYSTEM FOR ASCERTAINING THE MAPPING BETWEEN VIRTUAL LANES AND PHYSICAL LANES IN A MULTI-LANE TRANSCEIVER

(75) Inventors: Paul Brooks, Ofterdingen (DE); Reiner Schnizler, Beuren (DE); Bernhard Mayer, Reutlingen (DE)

(73) Assignee: JDSU Deutschland GmbH, Eningen (DE)

( * ) Notice: Subject to any disclaimer, the term of this patent is extended or adjusted under 35 U.S.C. 154(b) by 497 days.

(21) Appl. No.: 13/081,620

(22) Filed: Apr. 7, 2011

(65) Prior Publication Data

US 2011/0255865 A1 Oct. 20, 2011

Related U.S. Application Data

(60) Provisional application No. 61/324,256, filed on Apr. 14, 2010.

(51) Int. Cl.
*G01R 31/08* (2006.01)
(52) U.S. Cl.
USPC .............................. 370/242; 370/248; 398/20
(58) Field of Classification Search
None
See application file for complete search history.

(56) References Cited

U.S. PATENT DOCUMENTS

| | | | |
|---|---|---|---|
| 6,628,621 B1 * | 9/2003 | Appleton et al. | 370/249 |
| 6,850,663 B2 | 2/2005 | Kikuchi et al. | |
| 2004/0228313 A1 * | 11/2004 | Cheng et al. | 370/342 |
| 2005/0185955 A1 * | 8/2005 | French et al. | 398/16 |
| 2006/0200708 A1 * | 9/2006 | Gentieu et al. | 714/704 |
| 2009/0161247 A1 | 6/2009 | Chiang et al. | |
| 2009/0324222 A1 * | 12/2009 | Kunjidhapatham et al. | 398/58 |
| 2011/0211827 A1 * | 9/2011 | Soto et al. | 398/25 |
| 2012/0148234 A1 * | 6/2012 | Bellagamba et al. | 398/28 |

* cited by examiner

*Primary Examiner* — Phirin Sam
(74) *Attorney, Agent, or Firm* — Volentine & Whitt, PLLC

(57) ABSTRACT

For an apparatus which communicates data of a number of virtual lanes over a number of physical lanes, where the number of virtual lanes is different than the number of physical lanes and where a mapping between the virtual lanes and the physical lanes is not fixed, a method is provided for ascertaining the mapping between the virtual lanes and the physical lanes. The method includes: applying an impairment to a communication capability of one of the physical lanes so as to increase bit errors for data communicated via said one physical lane; determining a test bit error rate for each of the plurality of virtual lanes while the impairment is applied to the communication capability of the one physical lane; and ascertaining from the test bit error rates which of the virtual lanes is/are mapped to the one physical lane whose communication capability was impaired.

20 Claims, 8 Drawing Sheets

METHOD AND SYSTEM FOR ASCERTAINING THE MAPPING BETWEEN VIRTUAL LANES AND PHYSICAL LANES IN A MULTI-LANE TRANSCEIVER

CROSS-REFERENCES TO RELATED APPLICATIONS

This claims priority under 35 U.S.C. §119 from U.S. provisional patent application 61/324,256, filed on 14 Apr. 2010 in the name of inventors Paul Brooks et al., the entirety of which is hereby incorporated by reference for all purposes as if fully set forth herein.

BACKGROUND AND SUMMARY

1. Field

This invention pertains to the field of multi-lane transceivers that map a plurality of virtual or logical lanes to a plurality of physical lanes, for example C form-factor pluggable (CFP) optical transceiver modules for 100 Gigabit Ethernet systems that employ a multiplexing technique such as wavelength division multiplexing (WDM).

2. Description

Multi-lane transmission is commonly employed to transmit a high data rate data signal over several parallel transmission links. At the transmit side, a data signal is distributed into a number (M) of sub-channels (referred to herein as virtual lanes or logical lanes) which are then mapped onto N transmission channels (herein referred to as physical lanes) for transmission, possibly together with some overhead information. For example, multi-lane transmission is employed in 10 Gbps Ethernet (10 GBASE-LX4) devices and systems, where a 10 Gbps stream is distributed to M=4 (four) virtual lanes (each virtual lane comprising a corresponding electrical signal) which in turn are mapped onto N=4 (four) physical lanes in the form of four optical channels on four different wavelengths on one fiber (4:4 mapping) using wavelength division multiplexing (WDM) with a fixed mapping scheme (IEEE 802.3 Part 4).

This fixed mapping scheme makes it easy to: (1) identify the corresponding optical channel when a specific virtual lane is corrupted; (2) use an optical spectrum analyzer (OSA) to extract the physical (optical) lane associated with a particular virtual lane; and (3) introduce defined impairments into a physical (optical) lane associated with a particular virtual lane.

However, in IEEE standard 100 GBps Ethernet systems, there is no unique or fixed allocation of virtual lanes to physical lanes (e.g., optical wavelengths), and due to the dynamic M:N mapping, there may be a multiplex of several virtual lanes on one physical lane.

FIG. 1 illustrates one example of a transceiver 100 that maps a plurality of virtual or logical lanes to a plurality of physical lanes. In particular, FIG. 1 illustrates a C form-factor pluggable (CFP) optical transceiver module for a 100 Gbps Ethernet system. Transceiver 100 includes: an M:N mapper 110, transmit optics 120, an optical multiplexer 130, an optical demultiplexer 140, receive optics 150, an N:M demapper 160, and in some embodiments a controller 170 connected to a management data input/output (MDIO) interface.

M:N mapper 110, which is a multiplexer and sometimes referred to as a "gearbox," maps M virtual lanes (each virtual lane comprising a corresponding electrical signal) to N physical lanes in the form of wavelength division multiplexed (WDM) optical channels.

In the particular example embodiment, where transceiver 100 is a CFP optical transceiver module for a 100 Gbps Ethernet system, M:N mapper 110 maps M=10 (ten) virtual lanes (electrical signals) each at 10 Gbps into N=4 (four) physical lanes (e.g., optical wavelengths) each at 25 Gbps.

At the receive side, N:M demapper 160, which also may be referred to as a gearbox, demultiplexes the N physical lanes (e.g., optical wavelengths) to the M virtual lanes (electrical signals).

The integrated circuit(s) with M:N mapper 110 and N:M demapper 160 include(s) a range of fast mux/demux paths whose start-up position is not known. As a result, the actual mapping of the virtual lanes to the physical lanes is not fixed or pre-determined. Instead, M:N mapper 110 starts in a random mapping state, and each time that the M:N mapper 110 is restarted, the mapping between virtual lanes and physical lanes may change. Therefore a user or tester of transceiver 100 cannot know a priori which of the virtual lanes (electrical signals) are mapped or assigned to a given physical lane (i.e., optical wavelength).

Knowing which virtual lanes (electrical signals) are mapped to a particular physical lane (i.e., optical wavelength) can be important during the development and testing phase of an optical transceiver, as the mapping can affect the performance of each individual virtual lane and optical lane. For example, without knowing which virtual (electrical) lanes are mapped to which physical (optical) lanes makes it difficult to determine the operational bit-error-rate (BER) of each physical (optical) lane. This in turn can make it difficult to identify, diagnose, and/or troubleshoot any problems that may occur for a particular physical lane.

Accordingly, it would be advantageous to provide a system and method of ascertaining the current mapping between virtual lanes and physical lanes in a transceiver where the mapping between virtual lanes and physical lanes is not fixed and therefore not known a priori. It would also be advantageous to provide a system and method of determining bit error rates (BERs) of physical lanes in a transceiver where there is no fixed mapping between virtual lanes and physical lanes. Other and further objects and advantages will appear hereinafter.

The present invention comprises a method and system for ascertaining the current mapping between virtual lanes and physical lanes in a multi-lane transceiver.

In one aspect of the invention, for an apparatus which communicates data of a number of virtual lanes over a number of physical lanes, where the number of virtual lanes is different than the number of physical lanes and where a mapping between the virtual lanes and the physical lanes is not fixed, a method is provided for ascertaining the mapping between the virtual lanes and the physical lanes. The method comprises: (a) applying an impairment to a communication capability of one of the physical lanes so as to increase bit errors for data communicated via said one physical lane; (b) determining a test bit error rate for each of the plurality of virtual lanes while the impairment is applied to the communication capability of the one physical lane; and (c) ascertaining from the test bit error rates which of the virtual lanes is/are mapped to the one physical lane whose communication capability was impaired In another aspect of the invention, a system is provided for testing an apparatus which communicates data of a number of virtual lanes over a number of physical lanes, where the number of virtual lanes is different than the number of physical lanes and where a mapping between the virtual lanes and the physical lanes is not fixed. The system comprises: a controller configured to supply a control signal to selectively impair a communication capability of one or more of the physical lanes; a bit error rate tester configured to determine a test bit error rate of the virtual lanes while the communication capability of the one or more physical lanes is impaired, and a graphical user interface configured to provide an indication of at least one of: (1) the test bit error rates of the virtual lanes while the communication capability of the one or more physical lanes is impaired; and (2) the mapping between the virtual lanes and the physical lanes of the apparatus.

DETAILED DESCRIPTION

Various examples embodiments of methods and systems will now be described for ascertaining a mapping between virtual lanes and physical lanes in a transceiver. To provide a concrete illustration, examples below will be described with respect to an optical transceiver, for example a C form-factor pluggable (CFP) optical transceiver module for 100 Gigabit Ethernet systems that employ a multiplexing technique such as wavelength division multiplexing (WDM). However, it should be understood that the principles that are described may be employed in a variety of other contexts with other transceivers which map a plurality of virtual or logical lanes to a plurality of physical lanes where the mapping is not known a priori.

Figure 2:
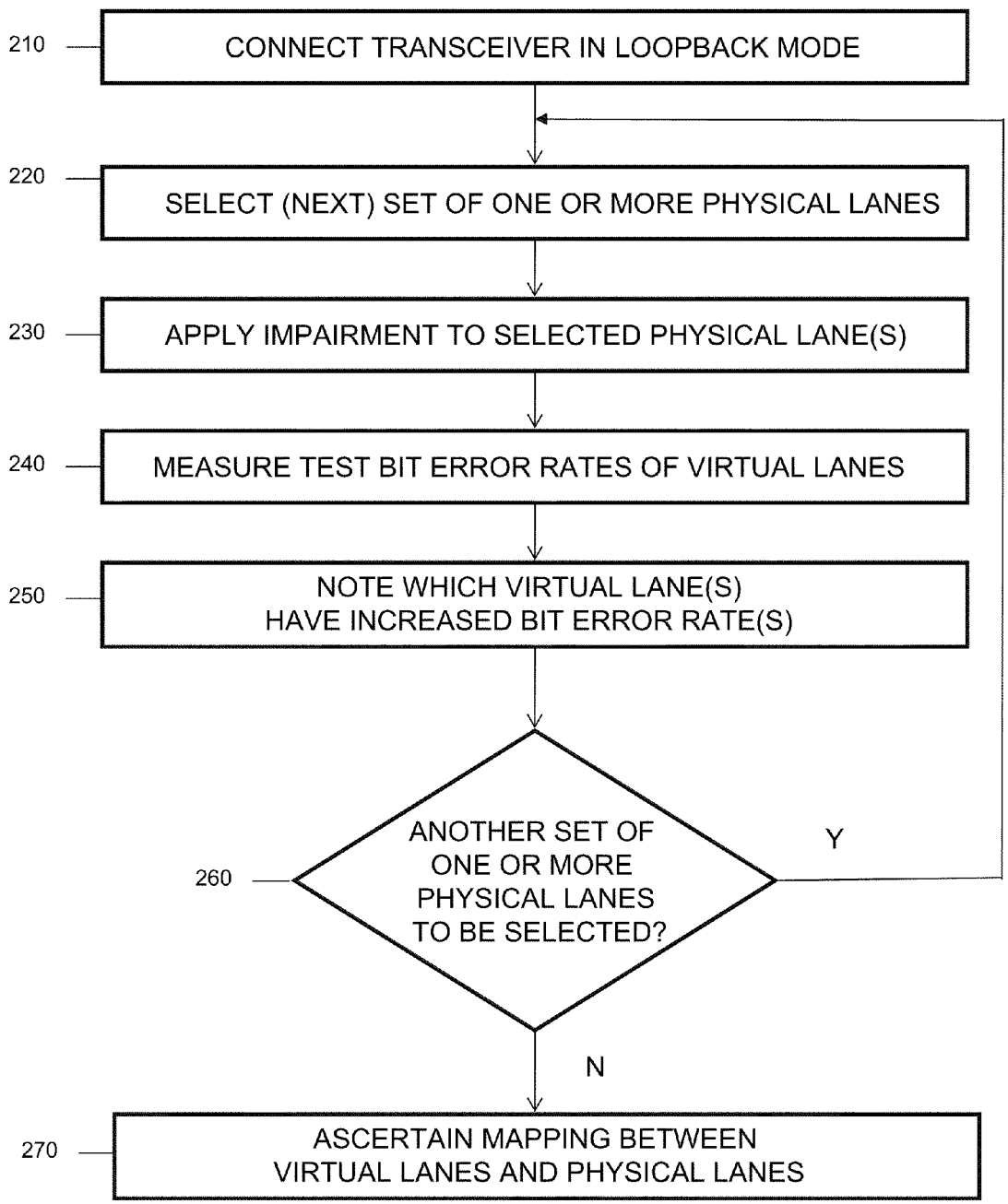
FIG. 2 is a flowchart of one example embodiment of a method of ascertaining the current mapping between virtual lanes and physical lanes in a transceiver.

FIG. 2 is a flowchart of one example embodiment of a method 200 of ascertaining the current mapping between virtual lanes and physical lanes in a transceiver.

At stage 210 of method 200, a transceiver or device under test (DUT) is put into a loopback mode where the multiplexed output from the transmitter is connected—directly or by means of some intervening device (e.g., an attenuator)—to the input of the receiver.

At stage 220, a set of one or more physical lanes of the DUT is selected.

At stage 230, an impairment is applied to the selected physical lane(s) of the DUT. In particular, an impairment is applied that causes an increase in the bit error rate of data communicated with the selected physical lane(s). In some embodiments, the impairment may include a total disabling of the selected physical lane(s). As will be discussed in further detail below, in some embodiments the impairment may be applied to: a transmitter of the DUT for the physical channel (e.g., reducing the transmitted signal level, which may include turning off the transmitter); a receiver of the DUT for the physical channel (e.g., changing a detection threshold level for the receiver from its normal level, which may include turning off the receiver); and/or applying a signal attenuation to the physical lane between the transmitter and the receiver of the DUT.

At a stage 240, bit error rates (BERs) of the virtual lanes of the DUT are measured while the impairment is applied to the selected physical lane(s). Hereafter, a BER of a virtual lane that is measured while an impairment is applied to one or more physical lanes will be referred to as a "test bit error rate" or "test BER" to distinguish such a measurement from the operational bit error rate (BER) of a virtual lane when no artificial impairment(s) is/are applied to the physical lanes. The test BERs for the virtual lanes may be measured sequentially or in parallel.

At a stage 250, it is noted which of the virtual lane(s) of the DUT experience an increased test BER or fail at stage 240 when the selected physical lane(s) is/are impaired. As described in greater detail below, in some embodiments the test BERs for the virtual channels at stage 240 are provided to a user or tester via a graphical user interface (GUI), for example displayed on a display device. In that case, the user or tester may manually note which of the virtual lane(s) of the DUT experience an increased test BER at stage 240 when the selected physical lane(s) is/are impaired, indicating that these virtual lane(s) are mapped to the impaired physical lane(s). As also described in greater detail below, some embodiments a controller, which may include a memory and a processor configured to execute an algorithm to ascertain the mapping between virtual lanes and physical lanes, may automatically identify which of the virtual lane(s) of the DUT experience an increased test BER at stage 240 when the selected physical lane(s) is/are impaired, indicating that these virtual lane(s) are mapped to the impaired physical lane(s), and store date indicating that mapping in memory.

At stage 260, it is determined whether another set of one or more physical lanes of the DUT should be selected for impairment. The number of sets, and the number of physical lanes in each set, must be selected to be sufficient to isolate each physical lane and uniquely identify which virtual lane(s) experience increased test BER(s) when each physical lane is impaired. For example, where there are N physical lanes, in one embodiment the method 200 may employ N sets of one physical lane each. However, a variety of other possibilities exist, some of which will be described in greater detail with respect to FIGS. 3-6 below.

If an additional set of one or more physical lanes of the DUT should be selected for impairment, then the process returns to stage 220 and repeats.

If there are no more sets of physical lanes of the DUT to be selected, then at stage 270 the mapping between the virtual lanes and the physical lanes of the DUT is ascertained from the test BER results of stage 250. In some embodiments, this mapping may be manually performed by a user or tester using the test BER results provided to the user or tester via the GUI. In some embodiments, the user or tester may then manually update a virtual-lane-to-physical-lane mapping or allocation table for the DUT. In some embodiments a controller may include a memory and a processor configured to execute an algorithm to automatically ascertain the mapping between virtual lanes and physical lanes from the test BER results from stage 250.

Subsequently, the user or tester may measure the operational BERs of all virtual lanes of the DUT with the impairments removed. The operational BERs for the virtual lanes may be measured sequentially or in parallel. The results for each virtual lane that was determined to be mapped to a particular physical lane may then be aggregated to determine the operational BER for that physical lane of the DUT. By this process, the operational BERs of all of the virtual lanes and all of the physical lanes of the DUT may be determined and may be provided to a user or tester via the GUI, for example by displaying them on a display device.

Severe transmission errors may cause an automatic restart of the DUT which normally results in a different lane mapping or assignment. Accordingly, a monitoring device is employed which detects any changes in lane assignment and when such a change is detected, stops the BER measurements and discards the last updates of the BER counter. In some embodiments, changes in the lane mapping may be detected or ascertained by comparing lane markers at the beginning and at the end of a BER measurement interval.

As noted above, there are a variety of ways in which the sets of one or more physical lanes of the DUT to be impaired in the method 200 may be configured and selected. Various embodiments with now be described with respect to FIGS. 3-6.

Figure 3:
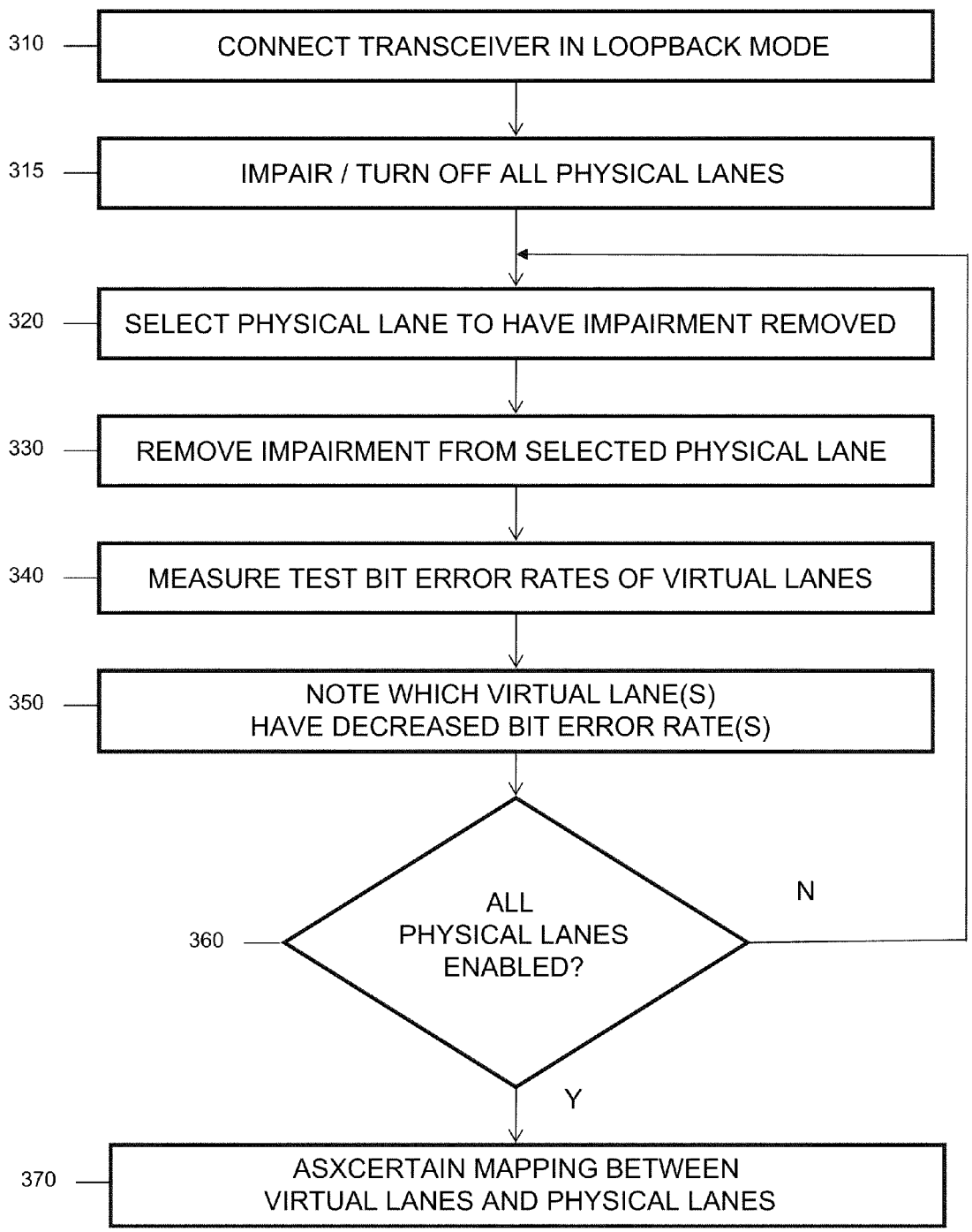
FIG. 3 is a flowchart of another example embodiment of a method of ascertaining the current mapping between virtual lanes and physical lanes in a transceiver.

FIG. 3 is a flowchart of another example embodiment of a method 300 of ascertaining the current mapping between virtual lanes and physical lanes in a transceiver. In particular, in method 300, all of the physical lanes of the DUT are first impaired or turned off, and then the impairment is removed from one physical lane at a time, until the impairment is removed from all of the physical lanes. Each time that the impairment is removed from another physical lane, the test BERs of the virtual channels are measured to ascertain which of the virtual channels experience an improved (lower) test BER.

Stage 310 of method 300 is the same as stage 200 of method 200 and so a description thereof will not be repeated.

At stage 315, all of the physical lanes of the DUT are impaired (e.g., turned off). Impairments may be applied as discussed above with respect to stage 230 of method 200.

At stage 320, a physical lane is selected to have its impairment removed (e.g., to be turned on).

At stage 330, the impairment is removed from the selected physical lane (e.g., the physical lane is turned on).

Stage 340 of method 300 is the same as stage 240 of method 200 and so a description thereof will not be repeated.

At a stage 350, it is noted which of the virtual lane(s) of the DUT experience a decreased (improved) test BER at stage 340 when the impairment is removed from the selected physical lane (e.g., the selected physical lane is turned on), indicating that these virtual lane(s) are mapped to the selected physical lane. This may be done manually or automatically as explained above with respect to stage 250 of method 200.

At stage 360, it is determined whether all of the physical lanes of the DUT have had their impairment removed (e.g., they are all turned on).

If there are one or more additional physical lanes of the DUT to be selected to have the impairment removed, then the process returns to stage 320 and repeats. Otherwise the method proceeds to stage 370.

At stage 370 of method 300 the mapping between the virtual lanes and the physical lanes of the DUT is ascertained from the test BER results of stage 350. This may be done manually or automatically as explained above with respect to stage 270 of method 200.

Figure 4:
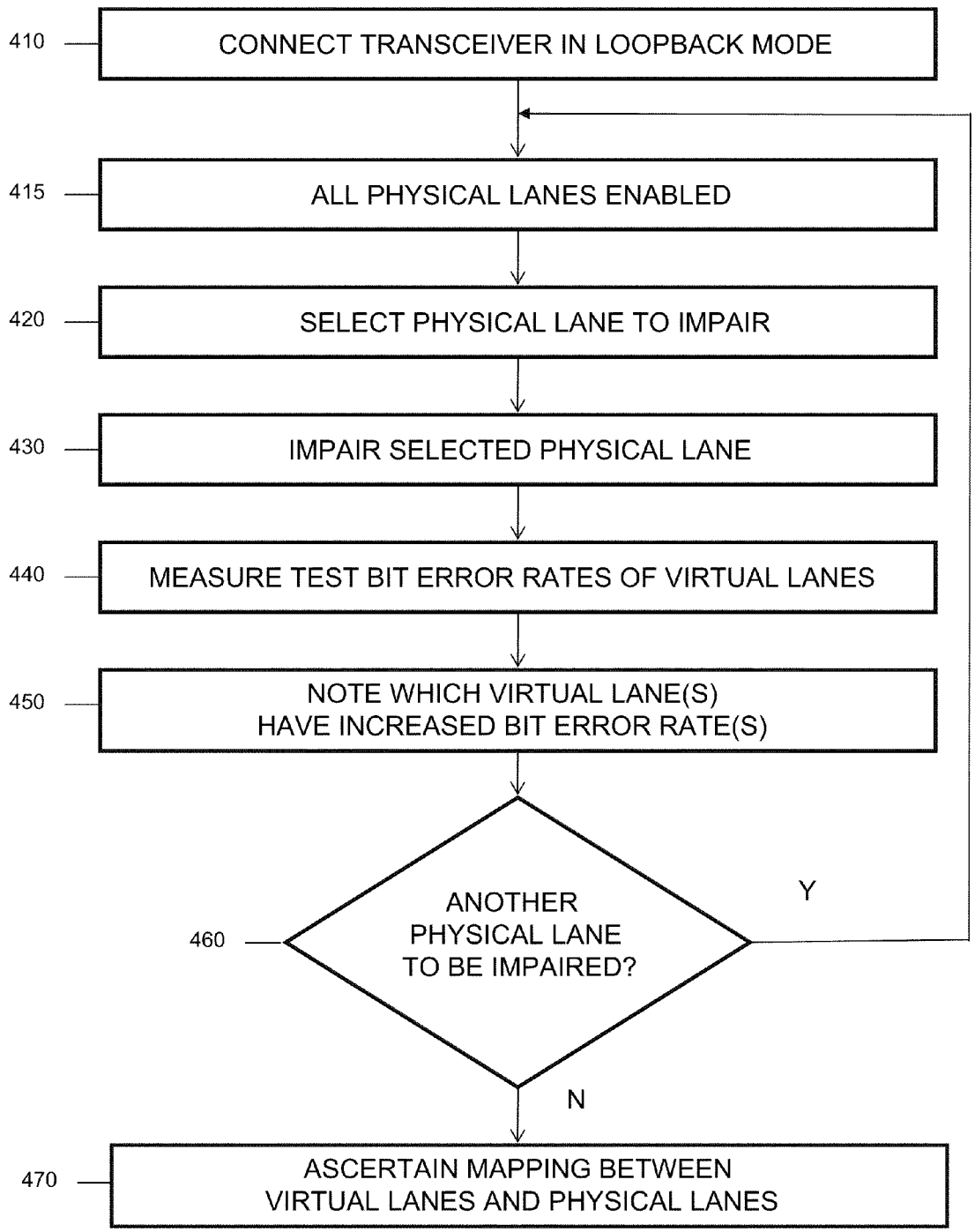
FIG. 4 is a flowchart of another example embodiment of a method of ascertaining the current mapping between virtual lanes and physical lanes in a transceiver.

FIG. 4 is a flowchart of another example embodiment of a method 400 of ascertaining the current mapping between virtual lanes and physical lanes in a transceiver. In particular, in method 400, all of the physical lanes of the DUT are first turned on, and then the impairment is applied to one physical lane at a time while all of the other physical lanes are unimpaired. Each time that the impairment is applied to a different physical lane of the DUT, the test BERs of the virtual channels of the DUT are measured to ascertain which of the virtual channels experience an increased (degraded) test BER.

Stage 410 of method 400 is the same as stage 200 of method 200 and so a description thereof will not be repeated.

At stage 415, all of the physical lanes of the DUT are enabled or turned on.

At stage 420, a physical lane of the DUT is selected to be impaired (e.g., to be turned off).

At stage 430, the impairment is applied to the selected physical lane (e.g., the physical lane is enabled). The impairment may be applied as discussed above with respect to stage 230 of method 200.

Stage 440 of method 400 is the same as stage 240 of method 200 and so a description thereof will not be repeated.

At a stage 450, it is noted which of the virtual lane(s) of the DUT experience an increased (degraded) test BER at stage 440 when the impairment is applied to the selected physical lane (e.g., the selected physical lane is turned off), indicating that these virtual lane(s) are mapped to the selected physical lane. This may be done manually or automatically as explained above with respect to stage 250 of method 200.

At stage 460, it is determined whether there are additional physical lanes of the DUT to be selected to be selectively impaired (e.g., to be turned off).

If there are one or more additional physical lanes of the DUT to be selected to be impaired (e.g., to be turned off), then the process returns to stage 415 and repeats. Otherwise the method proceeds to stage 470.

At stage 470 of method 400 the mapping between the virtual lanes and the physical lanes of the DUT is ascertained from the test BER results of stage 450. This may be done manually or automatically as explained above with respect to stage 270 of method 200.

Figure 5:
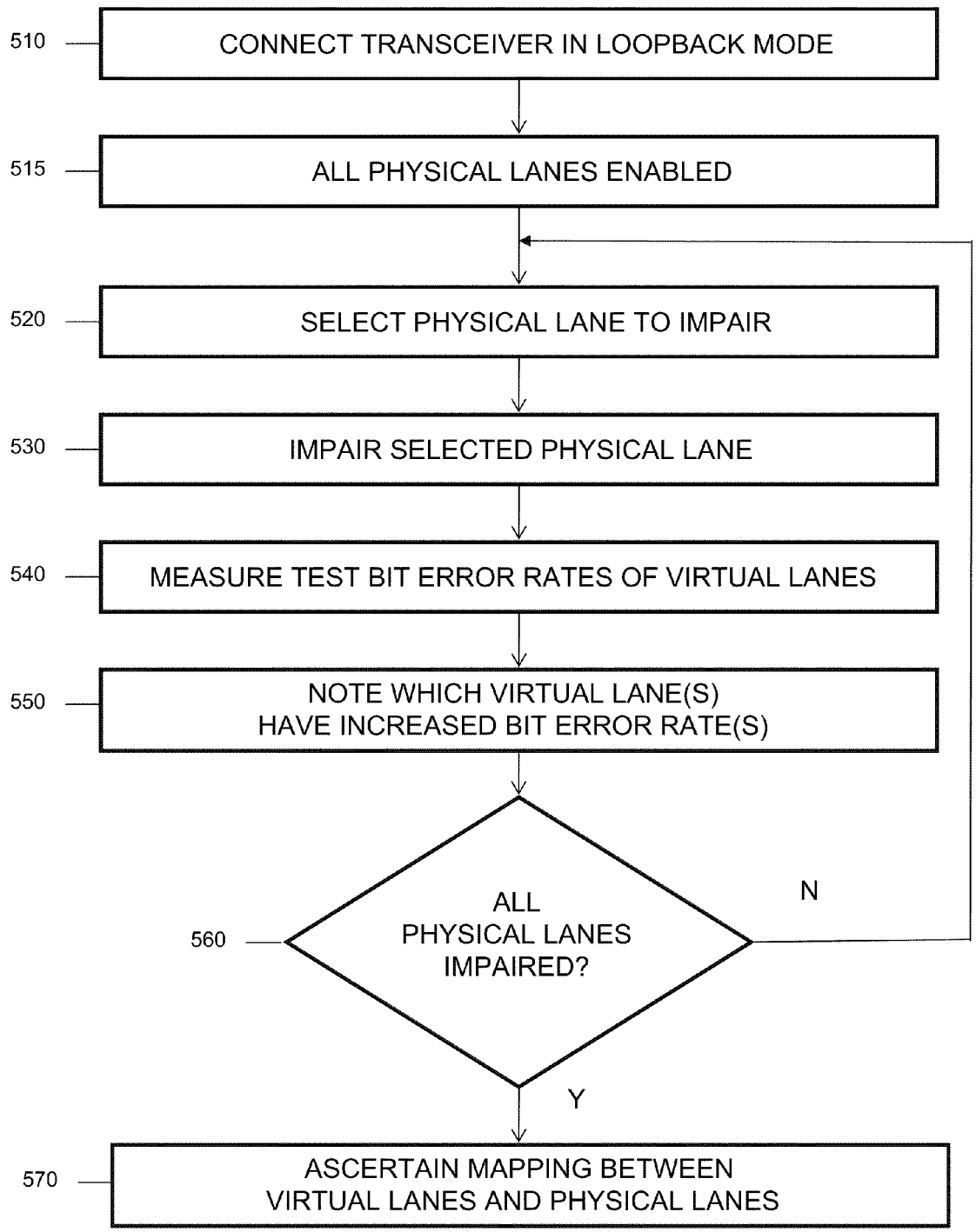
FIG. 5 is a flowchart of another example embodiment of a method of ascertaining the current mapping between virtual lanes and physical lanes in a transceiver.

FIG. 5 is a flowchart of another example embodiment of a method 500 of ascertaining the current mapping between virtual lanes and physical lanes in a transceiver. The method 500 is similar to the method 400, but in the method 500 the impairment is applied to one physical lane of the DUT at a time until all of the physical lanes are impaired.

Stage 510 of method 500 is the same as stage 200 of method 200 and so a description thereof will not be repeated.

At stage 515, all of the physical lanes of the DUT are enabled or turned on.

At stage 520, a physical lane of the DUT is selected to be impaired (e.g., to be turned off).

At stage 530, the impairment is applied to the selected physical lane (e.g., the physical lane is enabled). The impairment may be applied as discussed above with respect to stage 230 of method 200.

Stage 540 of method 500 is the same as stage 240 of method 200 and so a description thereof will not be repeated.

At a stage 550, it is noted which of the virtual lane(s) of the DUT experience an increased (degraded) test BER at stage 540 when the impairment is applied to the selected physical lane (e.g., the selected physical lane is turned off), indicating that these virtual lane(s) are mapped to the selected physical lane. This may be done manually or automatically as explained above with respect to stage 250 of method 200.

At stage 560, it is determined whether there are additional physical lanes of the DUT to be selected to be impaired (e.g., to be turned off).

If there are one or more additional physical lanes to be selected to be impaired (e.g., to be turned off), then the process returns to stage 520 and repeats. Otherwise the method proceeds to stage 570.

At stage 570 of method 500 the mapping between the virtual lanes and the physical lanes of the DUT is ascertained from the test BER results of stage 550. This may be done manually or automatically as explained above with respect to stage 270 of method 200.

Figure 6:
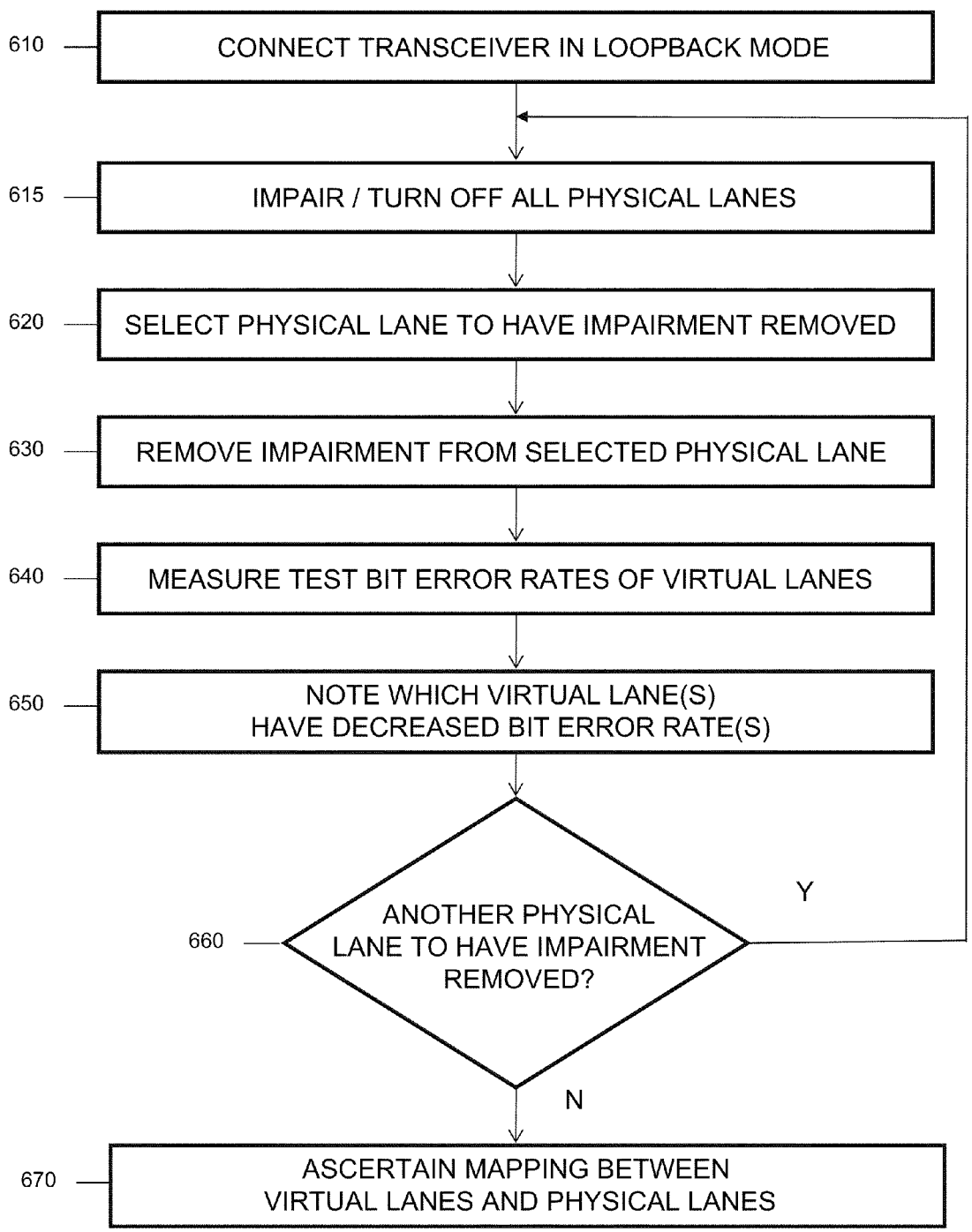
FIG. 6 is a flowchart of another example embodiment of a method of ascertaining the current mapping between virtual lanes and physical lanes in a transceiver.

FIG. 6 is a flowchart of another example embodiment of a method 600 of ascertaining the current mapping between virtual lanes and physical lanes in a transceiver. In particular, in method 600, all of the physical lanes of the DUT are first impaired (e.g., turned off)s, and then the impairment is removed from one physical lane at a time while all of the other physical lanes remain impaired. Each time that the impairment is removed from a different physical lane of the DUT, the test BERs of the virtual channels of the DUT are measured to ascertain which of the virtual channels experience a decreased (improved) test BER.

Stage 610 of method 600 is the same as stage 200 of method 200 and so a description thereof will not be repeated.

At stage 615, all of the physical lanes of the DUT are impaired (e.g., turned off). Impairments may be applied as discussed above with respect to stage 230 of method 200.

At stage 620, a physical lane is selected to have its impairment removed (e.g., to be turned on).

At stage 630, the impairment is removed from the selected physical lane (e.g., the physical lane is turned on).

Stage 640 of method 600 is the same as stage 240 of method 200 and so a description thereof will not be repeated.

At a stage 650, it is noted which of the virtual lane(s) of the DUT experience a decreased (improved) test BER at stage 640 when the impairment is removed from the selected physical lane (e.g., the selected physical lane is turned on), indicating that these virtual lane(s) are mapped to the selected physical lane. This may be done manually or automatically as explained above with respect to stage 250 of method 200.

At stage 660, it is determined whether or not there are additional physical lanes of the DUT to be have their impairment selectively removed (e.g., to be turned on).

If there are one or more additional physical lanes of the DUT to be selected to have the impairment removed, then the process returns to stage 615 and repeats. Otherwise the method proceeds to stage 670.

At stage 670 of method 600 the mapping between the virtual lanes and the physical lanes of the DUT is ascertained from the test BER results of stage 650. This may be done manually or automatically as explained above with respect to stage 270 of method 200.

Figure 7:
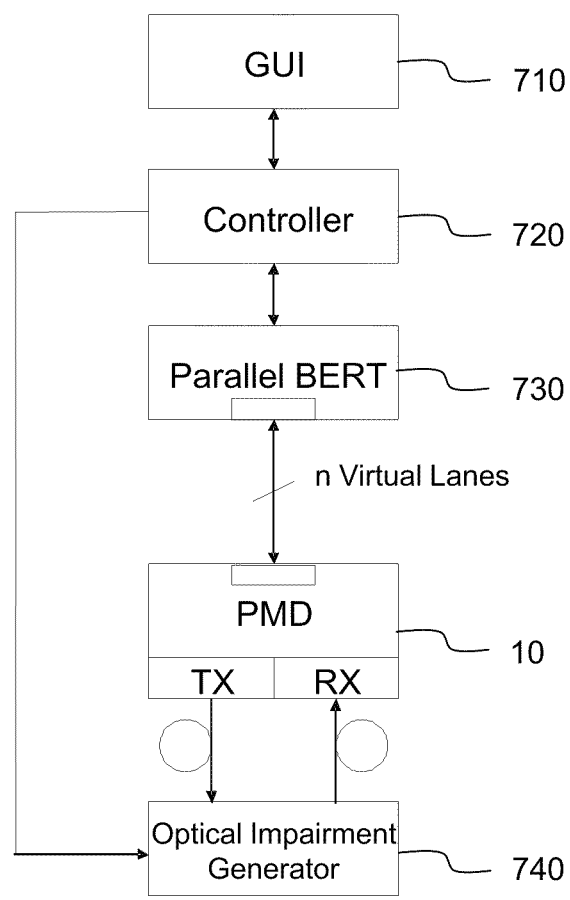
FIG. 7 is a functional block diagram of one embodiment of a system for ascertaining the current mapping between virtual lanes and physical lanes in a transceiver.

FIG. 7 is a functional block diagram of one embodiment of a system for ascertaining the current mapping between virtual lanes and physical lanes in a transceiver or physical media device (PMD) 10.

Figure 1:
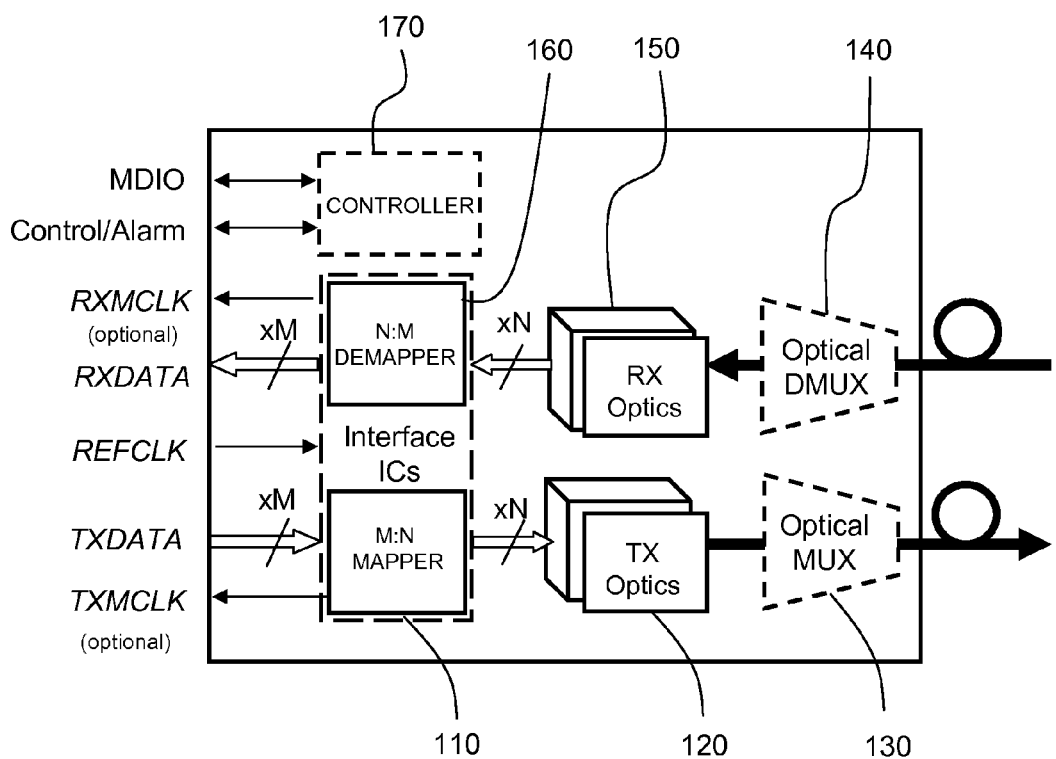
FIG. 1 is a functional block diagram of one example of a transceiver.

PMD 10 may be a C form-factor pluggable (CFP) optical transceiver module for a 100 Gbps Ethernet system, such as the transceiver 100 of FIG. 1.

The system of FIG. 7 includes a graphical user interface (GUI) 710, a controller 720, a bit error rate tester (BERT) 730, and an optical impairment generator 740. In some embodiments, optical impairment generator 740 may comprise a variable optical attenuator (VOA).

The system of FIG. 7 may be employed to perform any of the methods 200, 300, 400, 500 or 600 of FIGS. 2-6. In that case, the system of FIG. 7 may selectively apply an impairment to one or more of the physical lanes of PMD 10 by means of optical impairment generator 740 (e.g., a VOA). For example, when the system of FIG. 7 is used to execute the method 400 for ascertaining the mapping between virtual lanes and physical lanes in PMD 10, a selected one of the physical lanes (optical wavelengths) of PMD 10 is impaired by optical impairment generator 740 under control of controller 710, which in turn impairs the virtual lanes (electrical channels) mapped on to that physical lane (optical wavelength). A user or tester can see via GUI 710 which virtual lanes have an increased test BER. The user can then use GUI 710 to manually update a virtual-lane-to-physical-lane map or allocation table for PMD 10. The impairment is then removed from the selected physical lane, and the process is repeated for the other physical lanes of the PMD 10. When the process is completed the user will have ascertained the current mapping between the virtual lanes and the physical lanes of PMD 10 (it is noted again that if the M:N or N:M gearbox in PMD 10 is interrupted, it may reset the lane mapping).

With the virtual lane to physical lane mapping now known, controller 720 may restart the BERT on all virtual lanes and can then aggregate the operational BER results from the virtual lanes carried on a particular physical lane to give an aggregated operational BER for the physical lane from the contribution of the individual virtual lanes. Accordingly, GUI 710 can display the operational BER performance for each virtual lane and physical lane of PMD 10.

Figure 8:
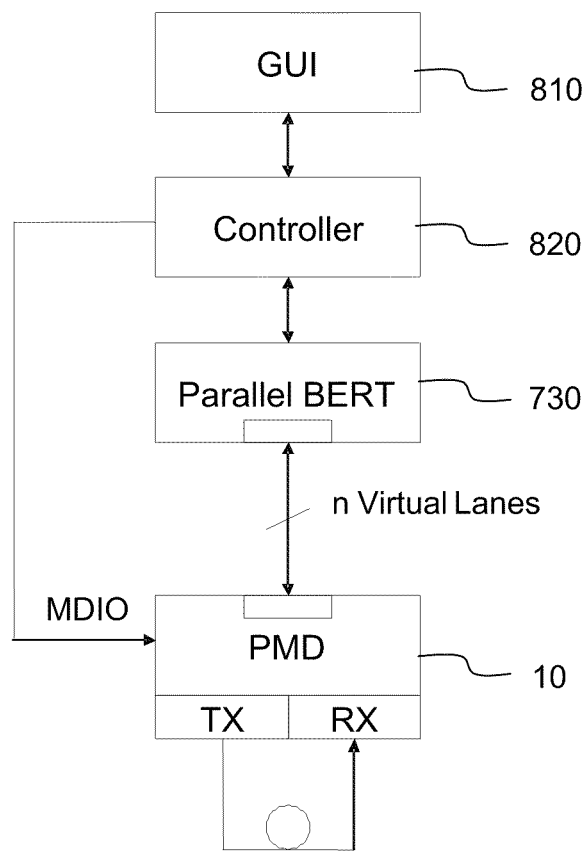
FIG. 8 is a functional block diagram of another embodiment of a system for ascertaining the current mapping between virtual lanes and physical lanes in a transceiver.

FIG. 8 is a functional block diagram of another embodiment of a system for ascertaining the current mapping between virtual lanes and physical lanes in a transceiver or PMD 10.

PMD 10 may be a C form-factor pluggable (CFP) optical transceiver module for a 100 Gbps Ethernet system, such as the transceiver 100 of FIG. 1.

The system of FIG. 8 includes a graphical user interface (GUI) 810, a controller 820, a bit error rate tester (BERT) 830.

In the system of FIG. 8, controller 820 exploits a Management Data Input/Output (MDIO) interface of PMD 10 to selectively impair one or more physical lanes of PMD 10. The system of FIG. 8 may be employed to perform any of the methods 200, 300, 400, 500 or 600 of FIGS. 2-6.

With command and control over the gearbox and optics in PMD 10 via the MDIO interface, it is possible for controller 820 to cause PMD 10 to turn off the individual physical lanes, rather than using the external optical impairment generator 740. This allows the process of ascertaining the mapping between the virtual lanes and physical lanes for PMD 10 to be carried out automatically as described below In some embodiments, the system of FIG. 8 impairs a physical lane in PMD 10 by reducing the amplitude (e.g., turning off) a transmitter for the physical lane in PMD 10.

Controller 820 causes PMD 10 to reduce the transmission level (e.g., turn off) a first optical transmitter (e.g., laser) via the MDIO interface, which impairs a corresponding physical lane for the optical transmitter.

Controller 820 then determines which virtual (electrical) lanes fail (e.g., exhibit a high test BER). These failed virtual lanes are then automatically associated with the impaired physical lane by a software algorithm executed by a processor associated with controller 820 for ascertaining the current mapping between virtual lanes and physical lanes for PMD 10. Then the transmitter for the physical lane that was impaired is restored and the process is automatically repeated for the other transmitters and physical lanes in PMD 10. Thus the mapping between the virtual lanes and the physical lanes of PMD 10 can be ascertained automatically.

In some embodiments, the system of FIG. 8 impairs a physical lane in PMD 10 so as to introduce bit errors in the physical lane by changing the threshold detection level (e.g., turning off) a receiver for the physical lane in PMD 10.

Controller 820 changes the threshold detection level (e.g., turns off) a first receiver via the MDIO interface, which impairs a corresponding physical lane for the optical transmitter, and then monitors the test BERs of the virtual (e.g., electrical) lanes to ascertain which virtual lanes fail.

These failed virtual lanes are then associated with the impaired physical lane by a software algorithm executed by a processor associated with controller 820 for ascertaining the current mapping between virtual lanes and physical lanes for PMD 10. Then the receiver for the physical lane that was impaired is restored and the process automatically repeated for the other receivers and physical lanes in PMD 10. Thus the mapping between the virtual lanes and the physical lanes of PMD 10 can be ascertained automatically.

With the virtual lane to physical lane mapping now known, controller 820 may restart the BERT on all virtual lanes and can then aggregate the operational BER results from the virtual lanes carried on a particular physical lane to give an aggregated operational BER for the physical lane from the contribution of the individual virtual lanes. Accordingly, GUI 810 can display the operational BER performance for each virtual lane and physical lane of PMD 10.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

We claim:

1. For an apparatus which communicates data of a number of virtual lanes over a number of physical lanes, where the number of virtual lanes is different than the number of physical lanes and where a mapping between the virtual lanes and the physical lanes is not fixed, a method comprising:
   (a) applying an impairment to a communication capability of one of the physical lanes of the apparatus as to increase bit errors for data communicated via said one physical lane;
   (b) determining a test bit error rate for each of the plurality of virtual lanes while the impairment is applied to the communication capability of the one physical lane of the apparatus; and
   (c) ascertaining from the test bit error rates which of the virtual lanes is/are mapped to the one physical lane whose communication capability was impaired.

2. The method of claim 1, further comprising:
   determining an operational bit error rate for each virtual lane that was ascertained to be mapped to the one physical lane, the operational bit error rate being determined without the impairment being applied to the communication capability of the one physical lane; and
   determining an operational bit error rate for the one physical lane from the operational bit error rate of each virtual lane that was ascertained to be mapped to the one physical lane.

3. The method of claim 1, further comprising performing steps (a) to (c) for each of the plurality of physical lanes of the apparatus to ascertain the mapping between all of the virtual lanes and all of the physical lanes of the apparatus.

4. The method of claim 3, wherein performing steps (a) to (c) for each of the plurality of physical lanes of the apparatus to ascertain the mapping between all of the virtual lanes and all of the physical lanes of the apparatus comprises sequentially applying the impairment to one physical lane at a time while all other physical lanes operate without the impairment.

5. The method of claim 3, wherein performing steps (a) to (c) for each of the plurality of physical lanes of the apparatus to ascertain the mapping between all of the virtual lanes and all of the physical lanes of the apparatus comprises operating all physical lanes without the impairment, and then sequentially applying the impairment to one physical lane until all physical lanes operate with the impairment.

6. The method of claim 3, wherein performing steps (a) to (c) for each of the plurality of physical lanes of the apparatus to ascertain the mapping between all of the virtual lanes and all of the physical lanes of the apparatus comprises applying the impairment to all of the physical lanes and then sequentially removing the impairment from one physical lane at a time while all other physical lanes operate with the impairment.

7. The method of claim 3, wherein performing steps (a) to (c) for each of the plurality of physical lanes of the apparatus to ascertain the mapping between all of the virtual lanes and all of the physical lanes of the apparatus comprises applying the impairment to all of the physical lanes and then sequentially removing the impairment from one physical lane at a time until all of the physical lanes operate without the impairment.

8. The method of claim 3, further comprising:
   determining an operational bit error rate for each virtual lane of the apparatus, the operation bit error rate for each virtual lane being determined without the impairment bring applied to the communication capability of any physical lane to which the virtual lane was ascertained to be mapped; and
   determining an operational bit error rate for each of the physical lanes of the apparatus from the operational bit error rate of each virtual lane that was ascertained to be mapped to the physical lane.

9. The method of claim 8, further comprising employing lane markers to ascertain when the mapping between the virtual lanes and the physical lanes changes while determining any of the test bit error rates or the operational bit error rates.

10. The method of claim 3, further comprising providing data for a display device to display the mapping between the virtual lanes and the physical lanes.

11. The method of claim 3, further comprising providing data for a display device to display the operational bit error rates of the virtual lanes of the apparatus and the operational bit error rates of the physical lanes of the apparatus.

12. The method of claim 1, wherein applying the impairment to the communication capability of one of the physical lanes so as to increase bit errors for data communicated via said one physical lane comprises attenuating a signal communicated over the one physical lane by means of a variable optical attenuator (VOA).

13. The method of claim 1, wherein applying the impairment to the communication capability of one of the physical lanes so as to increase bit errors for data communicated via said one physical lane comprises reducing a signal level transmitted by a transmitter in the apparatus for the one physical lane.

14. The method of claim 1, wherein applying the impairment to the communication capability of one of the physical lanes so as to increase bit errors for data communicated via said one physical lane comprises changing a detection threshold level of a receiver in the apparatus for the one physical lane.

15. The method of claim 1, comprising employing a bit error rate testing apparatus to determine the test bit error rate for each of the plurality of virtual lanes, wherein each of the physical lanes corresponds to a different optical wavelength in a wavelength division multiplexing (WDM) communication system.

16. A system for testing an apparatus which communicates data of a number of virtual lanes over a number of physical lanes, where the number of virtual lanes is different than the number of physical lanes and where a mapping between the virtual lanes and the physical lanes is not fixed, the system comprising:

a controller configured to supply a control signal to selectively impair a communication capability of one or more of the physical lanes;

a bit error rate tester configured to determine a test bit error rate of the virtual lanes while the communication capability of the one or more physical lanes is impaired, and a graphical user interface configured to provide an indication of at least one of: (1) the test bit error rates of the virtual lanes while the communication capability of the one or more physical lanes is impaired; and (2) the mapping between the virtual lanes and the physical lanes of the apparatus.

17. The system of claim 16, wherein the control signal reduces a signal level transmitted by one or more transmitters of the apparatus for the one or more physical lanes.

18. The system of claim 16, wherein the control signal changes a detection threshold level of one or more receivers of the apparatus for the one or more physical lanes.

19. The system of claim 16, further comprising a variable optical attenuator (VOA) configured to receive the control signal and in response thereto to attenuate one or more signals carried over the one or more physical lanes.

20. The system of claim 16, wherein the controller is configured to ascertain the mapping between the virtual lanes and the physical lanes.

* * * * *